US007290895B2

(12) United States Patent
Hunt

(10) Patent No.: US 7,290,895 B2
(45) Date of Patent: Nov. 6, 2007

(54) FILE SYSTEM FOR A STAGE LIGHTING ARRAY SYSTEM

(75) Inventor: Mark A. Hunt, Derby (GB)

(73) Assignee: Production Resource Group, L.L.C., New Windsor, NY (US)

( * ) Notice: Subject to any disclaimer, the term of this patent is extended or adjusted under 35 U.S.C. 154(b) by 531 days.

(21) Appl. No.: 10/913,022

(22) Filed: Aug. 6, 2004

(65) Prior Publication Data

US 2005/0086589 A1 Apr. 21, 2005

Related U.S. Application Data

(60) Provisional application No. 60/493,862, filed on Aug. 8, 2003.

(51) Int. Cl.

| | |
|---|---|
| ***F21V 33/00*** | (2006.01) |
| ***B60Q 1/124*** | (2006.01) |
| ***H05B 37/00*** | (2006.01) |
| ***H05B 39/00*** | (2006.01) |
| ***H05B 41/00*** | (2006.01) |
| ***G05B 19/18*** | (2006.01) |
| ***G05B 11/01*** | (2006.01) |
| ***G06F 15/177*** | (2006.01) |
| ***G06F 3/00*** | (2006.01) |

(52) U.S. Cl. ........................ 362/85; 362/233; 315/316; 315/318; 700/3; 700/17; 700/19; 715/735; 715/740; 715/760

(58) Field of Classification Search .................... 700/3, 700/17, 19, 286, 295, 297; 362/85, 233, 362/286, 301; 315/189, 312, 316, 318, 362; 345/6, 423; 353/62, 72, 85; 709/231; 715/735, 715/740, 760

See application file for complete search history.

(56) References Cited

U.S. PATENT DOCUMENTS

| | | | | |
|---|---|---|---|---|
| 5,061,997 | A * | 10/1991 | Rea et al. | 348/143 |
| 5,769,527 | A * | 6/1998 | Taylor et al. | 362/85 |
| 5,812,422 | A * | 9/1998 | Lyons | 703/18 |
| 5,940,049 | A * | 8/1999 | Hinman et al. | 353/20 |
| 5,969,485 | A | 10/1999 | Hunt | |
| 5,983,280 | A | 11/1999 | Hunt | |
| 6,029,122 | A | 2/2000 | Hunt | |
| 6,175,771 | B1 | 1/2001 | Hunt et al. | |
| 6,429,867 | B1 * | 8/2002 | Deering | 345/423 |
| 6,538,797 | B1 | 3/2003 | Hunt | |
| 6,548,967 | B1 * | 4/2003 | Dowling et al. | 315/318 |
| 6,549,326 | B2 | 4/2003 | Hunt et al. | |
| 6,597,132 | B2 | 7/2003 | Hunt et al. | |
| 6,765,544 | B1 * | 7/2004 | Wynne Willson | 345/6 |
| 6,774,584 | B2 * | 8/2004 | Lys et al. | 315/362 |
| 6,801,353 | B2 | 10/2004 | Hunt et al. | |

(Continued)

FOREIGN PATENT DOCUMENTS

JP 2003068473 A * 3/2003

*Primary Examiner*—Crystal J. Barnes
(74) *Attorney, Agent, or Firm*—Fish & Richardson P.C.

(57) ABSTRACT

A file system for a stage lighting system that maintains the different files associated with the stage lighting system. Each of the files that can represent an effect are maintained within the system within a configuration file. The configuration file can be updated on each start of the system so that the system can maintain information indicative of current configuration files. A test mode can also be entered in which a pre-formed show can be tested against the current state of the configuration files.

40 Claims, 3 Drawing Sheets

U.S. PATENT DOCUMENTS

| | | | | |
|---|---|---|---|---|
| 6,891,656 | B2 | 5/2005 | Hunt | |
| 6,894,443 | B2 | 5/2005 | Hunt et al. | |
| 6,922,679 | B2 * | 7/2005 | Watkins | 706/14 |
| 7,057,797 | B2 | 6/2006 | Hunt | |
| 7,139,617 | B1 * | 11/2006 | Morgan et al. | 700/17 |
| 7,148,632 | B2 * | 12/2006 | Berman et al. | 315/189 |
| 7,161,562 | B1 | 1/2007 | Hunt et al. | |
| 2002/0078221 | A1 * | 6/2002 | Blackwell et al. | 709/231 |
| 2004/0160198 | A1 | 8/2004 | Hewlett et al. | |
| 2004/0252486 | A1 * | 12/2004 | Krause et al. | 362/85 |
| 2005/0057543 | A1 | 3/2005 | Hunt et al. | |
| 2005/0083487 | A1 | 4/2005 | Hunt et al. | |
| 2005/0086589 | A1 | 4/2005 | Hunt | |
| 2005/0094635 | A1 | 5/2005 | Hunt | |
| 2005/0190985 | A1 | 9/2005 | Hunt | |
| 2005/0200318 | A1 | 9/2005 | Hunt et al. | |
| 2005/0206328 | A1 | 9/2005 | Hunt | |
| 2005/0207163 | A1 | 9/2005 | Hunt | |
| 2005/0213335 | A1 | 9/2005 | Hunt | |
| 2006/0158461 | A1 | 7/2006 | Reese et al. | |
| 2006/0187532 | A1 | 8/2006 | Hewlett et al. | |
| 2006/0227297 | A1 | 10/2006 | Hunt | |

* cited by examiner

FILE SYSTEM FOR A STAGE LIGHTING ARRAY SYSTEM

CROSS-REFERENCE TO RELATED APPLICATION

This application claims benefit of the priority of U.S. Provisional Application Ser. No. 60/493,862 filed Aug. 8, 2003 and entitled "File System for a Stage Lighting Array System."

BACKGROUND

Stage lighting systems may be extremely complex. A typical system may include a console which controls a number of different lighting systems. Each lighting system may be a self-contained system, or may be a computer-based box that controls an external system. Many complicated effects are often carried out during the show. The complicated effects require knowledge of the files that actually exist within each lamp.

SUMMARY

The present system defines a special file system and discovery mechanism for automatically determining the content of certain files in a display system of a type adapted for digital control of an external projector.

DETAILED DESCRIPTION

Figure 1:
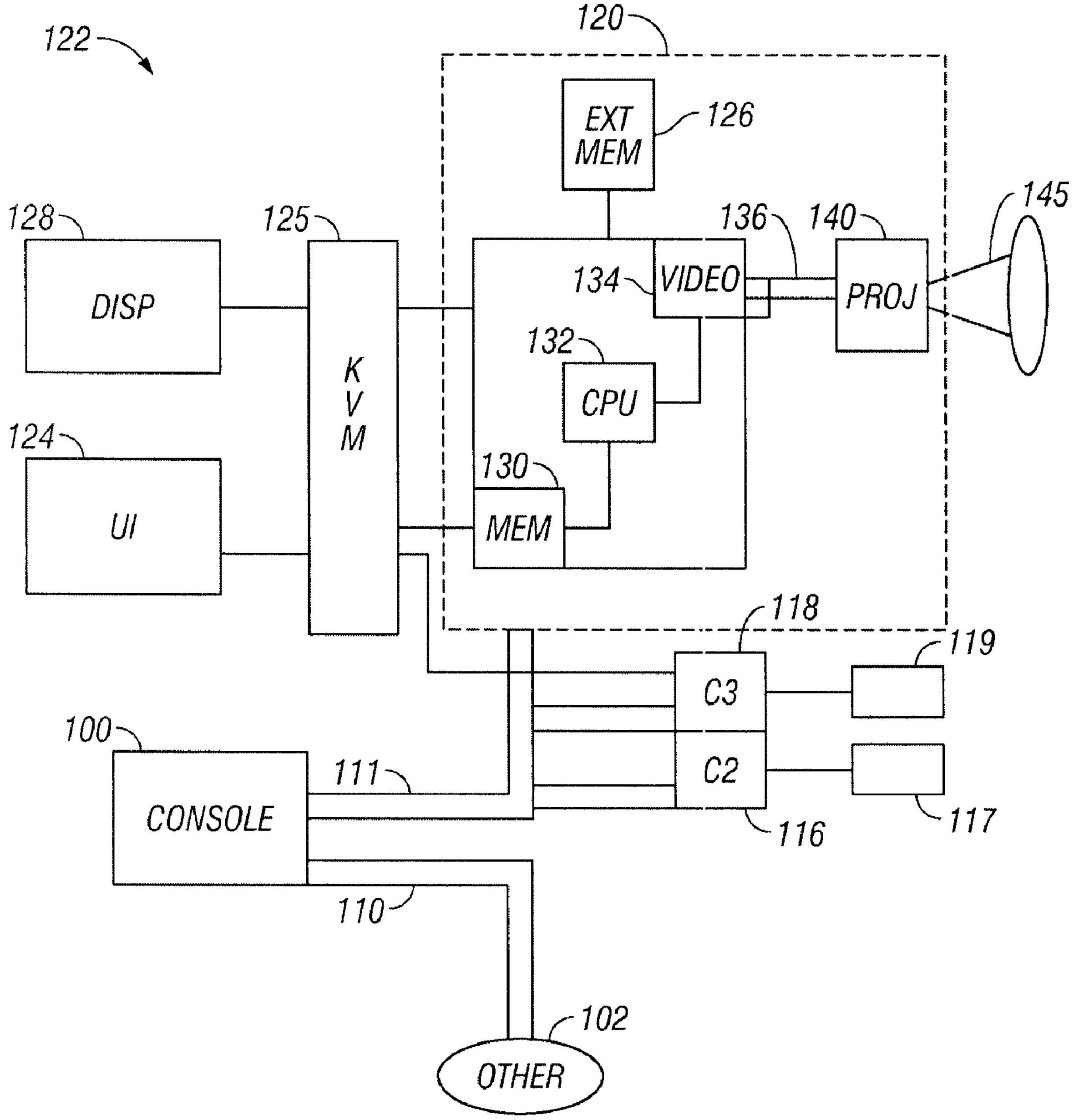
FIG. 1 shows a block diagram of the overall system.

A block diagram of the basic system is shown in FIG. 1. A number of lights collectively form a "show", with the number of lights typically being between 5 and 200 lights, although there is no actual limit on the number of lights that can form a show. Effects being produced by all of these lights are controlled by the console 100, under control of a lighting designer or operator. The console may produce one or many outputs which collectively control the array of lights. In FIG. 1, the line 111 is shown connected from console 100, to control a first light assembly 120 which is explained in further detail. The line 110 is shown as controlling other lights shown generically as 102; where it should be understood That there are at least 2 lights, and more typically between 5 and 200 lights in the overall show. In an embodiment, the controlling line 110 may be a control using ethernet protocol.

The actual light 120 being controlled by the control line 102 is an M BOX (™) light made by Light and Sound Design, Ltd. The M BOX is formed of a computer part 122 which is programmed with suitable programs as described herein, a user interface 124, an external memory source 126, and a display 128. In a preferred embodiment, a keyboard switch or KVM switch 125 is used so that the user interface 124 and display 128 may be used in common for all of a multiplicity of different computer units 122,116 & 118.

The computer part 122 also includes its own internal memory 130, which stores both programs which are used for image processing, and also stores prestored gobos and effects to be used by the light. For example, the memory 130 may store video clips, as well as a number of different shapes, and may store specified libraries from different gobo manufacturers. The gobo shapes may be used to shape the outer shape of the light beam being projected. In an embodiment, the final effect produced by the light may be a combination of a number of different layers, and the shape of the layer may also be controlled by the images stored in memory 130.

The computer part 122 also includes a processor shown as CPU 132, and a video card 134. All of these may be off-the-shelf items. The CPU 132 operates based on the programs stored in memory 130 to produce a video output using video card 134. The video output 136 is connected to an external projector 140. In an embodiment, this projector 140 may be a projector which is digitally controllable, which is to say that each of a plurality of digital bits forming the image is separately controllable for brightness, color and other aspects such as duty cycle. For example, the projector 140 may be a digital micromirror based device or DMD, also referred to as a digital light processor based device. The projector produces an output effect 145 which is used for part of the show. For example, the effect 145 may be projected onto the stage.

As explained above, there be may be a number of computer units 122 controlled by the common user interface 124 and display 128, and also controlled by the ethernet control signal 102. In this embodiment, two additional computer units 116 and 118 are shown, each also controlling external projectors 117, 119 to produce other lighting effects.

In operation, the CPU 132 operates according to a stored program to carry out certain operations based on the basic shapes and effects which are stored in the memory 130. For example, the CPU 132 typically controls a number of different layers collectively forming the image which is used to control the projector. Each of these layers may define shape, color and movement. The movements can be rotations or can be more complicated movements. One layer may cover any other layer or may add to or subtract from any of the other layers. The combined images, as controlled in this way, form a composite image 136 which is used to control the projector.

Figure 2:
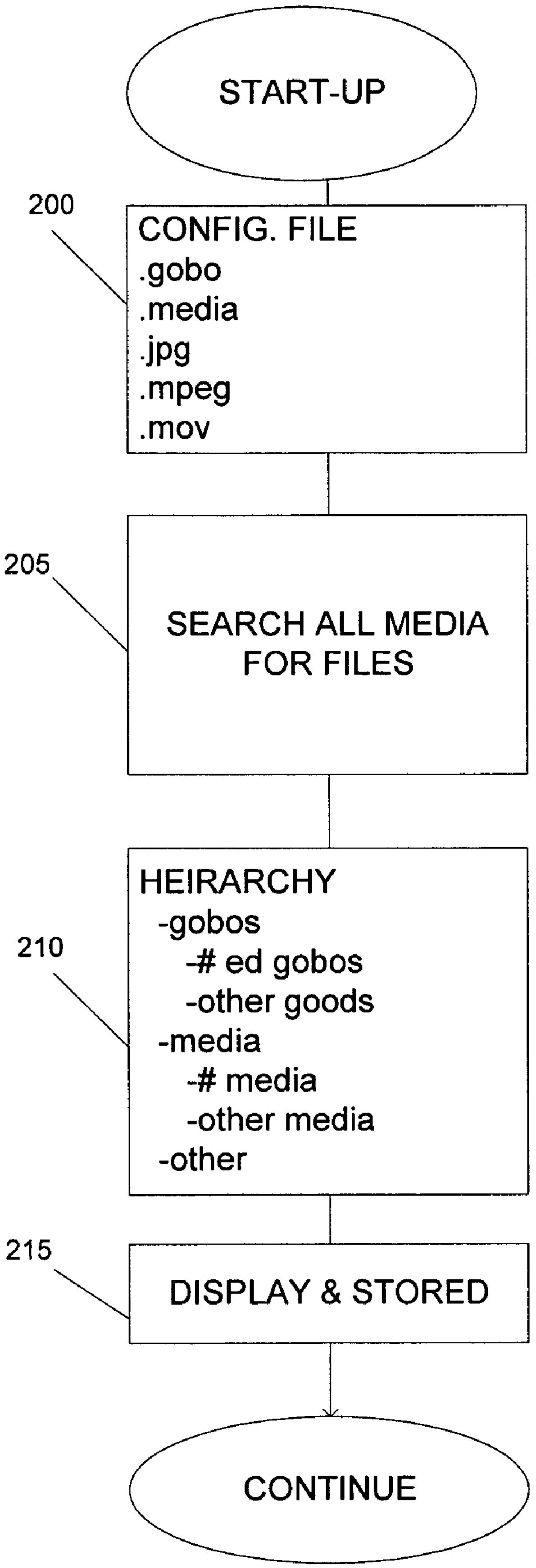
FIG. 2 shows a flowchart of operation of the stored a routine which automatically indexes the kinds of files which can be used.

The images may be stored in memory as libraries, or may be part of external memory 126 that is added to the libraries. The CPU 132, however, needs to know which images it can use. Accordingly, the CPU executes the routine shown in FIG. 2 at startup. This routine enables the system to look for all of the different files and effects which can be used during the operation.

At 200, the device looks for its configuration file. The configuration file defines which kinds of files to look for in the system. Typical files may be files of type "gobo", type "media", as well as more conventional types such as JPEG and MPEG files may be used. In addition, the user can specify different types of files. The type of gobo in the type "media" are special files for use with the M BOX system. The "gobo" file comprises compiled code representing an effect of a gobo, which may comprise an image which is compiled to include a certain effect.

At 205, the processor searches all the memory media which may include memory 130, as well as external memory 126, for all files of the specified types. This search may use an indexing technique for faster results. For example, the indexing technique may index all files on the memory 130 during spare time of the computer 122. Any file which is added after the index, of course, needs to be searched separately and otherwise the system simply searches the index. A similar indexing technique may be used for external memory 126 by using a serial number of the external memory; that is, by using a unique identifying code referring to the removable memory. The external memory may be a removable memory such as a memory stick or like nonvolatile memory, or a CD or DVD drive.

At 210, the CPU makes a list of all the found files, and arranges them in a specified hierarchy. In one preferred hierarchy, a hyperlinked list, for example, in XML, is formed. The list may show the basic overall categories such as gobos, media, and others. Clicking on any item on the list may produce a sublist. Under the gobos, there is a sublist for numbered gobos, and other gobos. The basic gobos in the library may be named according to a 16-bit gobo number which uniquely identifies the gobo as part of the library. However, gobos may also be named as different things, hence the external gobos may be other gobos. Similarly, media may be numbered in a similar way, and numbered media and other media may be separately identified. Clicking on any item, such as the numbered gobos, can bring up the list of gobos or may bring up a sublist of the different gobos.

The file names associated with the gobos may also include MetaTag information, and that MetaTag information may be viewable as part of the XML hierarchy. In addition, the hierarchy shown in 210 may optionally include thumbnails or may include the light showing certain information about the gobos in the media. For example, for gobos, the thumbnail may show the basic shape of the gobo. The thumbnails may be automatically produced as a preview, or may be entered by a user as part of the meta tag information. The other information, which is shown as part of the hierarchy, may be any other feature which can be used to effect the output video produced at 134. For example, different effects which can be added to gobos can be compiled and stored as a file. The different effects may be specified types of rotation, shaping, and other such effects.

Basically any effect which can be used on an image can be compiled as one of the other effects.

The Meta Tag information and/or thumbnail information can include some information about the different gobos which are used. This hierarchy of files is displayed to the user at 215, and may be also stored in a specified location so that the user can call up the XML file at any point. In this way, a user can find the different files which exist on the system.

Figure 3:
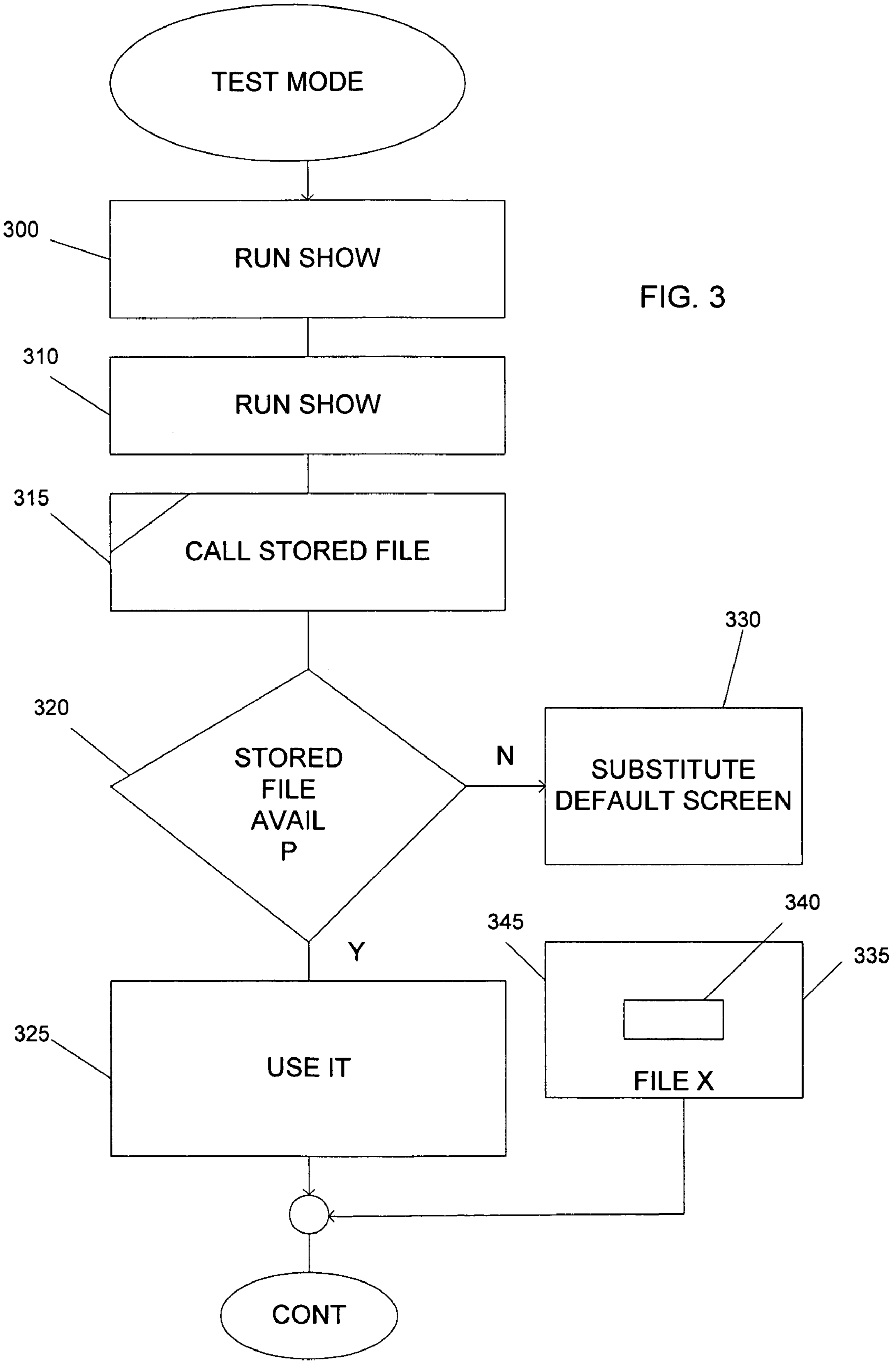
FIG. 3 shows a flowchart of operation of a special test mode.

In operation, the user/operator can select any of the files for part of the show. In addition, a show can be tested to determine if all the files needed for that show are available. The testing is carried out by entering a test mode which is shown in FIG. 3. In this test mode, the user commands that a show be run at 300. The processor begins running the show at 310 by calling up all necessary stored files and producing the layers representing those stored files with an output. The operation involves calling a stored file at 315. At 320, the system determines if the stored file is available. This may be done by searching the XML file for an index or by searching all files in the system. If the stored file is available, then the stored file is used and operation continues at 325. However, if the stored file is not available at 320, then a special default screen is substituted at 330. In an embodiment, the special default screen is as shown in 335; that is a black bar 340 shown on a white screen 345. A black bar preferably goes across approximately 70% of the screen both in width and in height directions. This default screen makes it very easy to determine which files are unavailable.

In an embodiment, the file name may also be alphanumerically placed on the default screen. The operation then continues to show the remainder of the show with the default screen in place of the missing file. A user reviewing this, however, may be able to determine, at a glance, that the default screen is present and therefore that a file is missing.

Although only a few embodiments have been disclosed in detail above, other modifications are possible. For example, other types of default screens may be used. In addition, other files besides those mentioned may be used, and also this system may be usable in other types of lighting instruments. For example, this system has been described as being used in a system in which the computer box which controls the image that is formed is separate from the projector that actually projects the image. However, the computer box 122 and projector 140 may be combined into a single device, such as the icon M device. In addition, while the above describes the projector as being a DMD based projector, other types of controlled projectors may also be used, including projectors based on grating light valves and the like.

All such modifications are intended to be encompassed within the following claims, in which:

What is claimed is:

1. A system, comprising a first computer system, including memory therein, said computer system also having a configuration file, which file represents a plurality of different effects which can be displayed by the computer system, and which includes a first controlling input, allowing control from a remote console, and a second output, which produces an output signal based on a selected one or more of said different effects from within said configuration file, wherein said configuration file lists the effects in a specified hierarchy.

2. A system as in claim 1, wherein said output signal is in a form for controlling an external digital projector.

3. A system as in claim 1, wherein said output signal is in a form for controlling a digital mirror type projector.

4. A system as in claim 1, wherein said computer system includes an internal memory storing a plurality of effects, and an external memory storing a plurality of effects wherein said configuration file includes information on all said effects.

5. A system as in claim 1, wherein one of said effects is a compiled file representing a gobo effect.

6. A system as in claim 1, further comprising a plurality of additional computer systems, and a user interface which is common for said computer systems, allowing local operation on each of said additional computer systems, and further comprising an input to each of said computer systems from a remote console.

7. A system as in claim 6, wherein said input from the remote console is an ethernet format input.

8. A system as in claim 1, wherein said output signal is in a form for controlling an external digital projector, wherein said output signal is formed from a plurality of different effects, each of said plurality of different effects forming a layer, and said layers collectively forming an effect.

9. A system as in claim 1, further comprising a user interface which displays contents of said configuration file, and includes information about at least a plurality of said effects within said configuration file.

10. The system as in claim 9, wherein said information includes a thumbnail showing the basic information about a gobo within the information file.

11. A system as in claim 9, wherein said information includes metadata about effects within the information file.

12. A system as in claim 1, wherein said effects include shapes which can be used to shape output light.

13. A system as in claim 1, wherein said effects include different effects which can be added to an output video.

14. A system as in claim 13, wherein said different effects include at least rotation and shaping.

15. A system, comprising a first computer system, including memory therein, said computer system also having a configuration file, which file represents a plurality of different effects which can be displayed by the computer system, and which includes a first controlling input, allowing control from a remote console, and a second output, which produces an output signal based on a selected one or more of said different effects from within said configuration file, further comprising a user interface which displays contents of said configuration file, and includes information about at least a plurality of said effects within said configuration file, wherein said information includes metadata about effects within the information file, wherein said configuration file is an XML file.

16. A system, comprising a first computer system, including memory therein, said computer system also having a configuration file, which file represents a plurality of different effects which can be displayed by the computer system, and which includes a first controlling input, allowing control from a remote console, and a second output, which produces an output signal based on a selected one or more of said different effects from within said configuration file, wherein said computer system includes processing parts which analyzes a routine to look for all different files and effects which can be used during the program to form said configuration file.

17. A method, comprising:

storing a plurality of lighting effects within a memory associated with a computer system, said lighting effects including at least a shape for output light to be projected;

forming a configuration file which represents a list of a plurality of different lighting effects; and accepting a command to produce a lighting effect from within a list of different lighting effects, and producing an output signal representing the lighting effect from the list, further comprising allowing the user to test a precompiled show, comprising a plurality of different effects, by retrieving stored files for the precompiled show, displaying information of the stored file is available, or displaying an error screen if the stored file is not available.

18. A system, comprising a first computer system, including memory therein, said computer system also having a configuration file, which file represents a plurality of different effects which can be displayed by the computer system, and which includes a first controlling input, allowing control from a remote console, and a second output, which produces an output signal based on a selected one or more of said different effects from within said configuration file, further comprising a plurality of additional computer systems, and a user interface which is common for said computer systems, allowing local operation on each of said additional computer systems, and further comprising an input to each of said computer systems from a remote console, wherein said user interface allows operating a test mode which determines if specified files are available.

19. A method, comprising:

storing a plurality of lighting effects within a memory associated with a computer system, said lighting effects including at least a shape for output light to be projected;

forming a configuration file which represents a list of a plurality of different lighting effects; and accepting a command to produce a lighting effect from within a list of different lighting effects, and producing an output signal representing the lighting effect from the list, wherein said producing an output signal comprises combining a plurality of different effects as different layers to produce a final output signal.

20. A method as in claim 19, wherein said output signal is in a form for controlling an external digital mirror type projector.

21. A method as in claim 19, wherein said storing comprises storing a first group of lighting effects in a first internal memory, and storing a second group of lighting effects in a second external memory.

22. A method as in claim 19, wherein said effects also include a rotation of a shaped output light beam.

23. A method as in claim 19, further comprising displaying information indicative of the configuration file to user at a local user interface.

24. A method as in claim 23, further comprising allowing the user to access certain files at the local user interface.

25. A method as in claim 19, wherein each layer is additive to a previous layer.

26. A method as in claim 19, wherein each layer is subtractive from a previous layer.

27. A method as in 19, wherein said forming a configuration file comprises controlling a processor to search for each of a plurality of different files and effects which can be used to produce lighting effects.

28. A method as in claim 27, wherein said controlling occurs at startup of the computer.

29. A method as in claim 27, wherein said controlling comprises looking for files indicative of still images, moving images, or compiled versions of a special effect.

30. A method as in claim 29, wherein said compiled versions comprise compiled rotations.

31. A method as in claim 27, wherein said search comprises searching information in memory.

32. A method as in claim 27, further comprising maintaining an index of files in memory, and wherein said search comprises searching said index.

33. A method as in claim 32, further comprising executing a routine which updates said index.

34. A method as in claim 32, wherein said index includes an index of file from a removable memory, and further comprising maintaining a list of information within the removable memory based on a unique identifier indicative of contents of said removable memory.

35. A method as in claim 19, wherein said configuration file includes a plurality of different gobos representing shaping of the light, each gobo having a unique identifying indicia.

36. A method as in claim 19, wherein said configuration file includes a hierarchy of the different gobos and effects, organized by a function of the different files.

37. A method as in claim 36, wherein said configuration file is in XML form.

38. A method as in claim 37, wherein said configuration file includes additional information about certain ones of the effects.

39. A method as in claim 38, wherein said additional information includes a thumbnail showing a basic shape of a gobo.

40. A method as in claim 19, wherein each of the different layers include a defined shape, a defined color, and a defined amount of movement.

* * * * *